(12) United States Patent
Baird

(10) Patent No.: US 12,008,591 B2
(45) Date of Patent: Jun. 11, 2024

(54) MACHINE LEARNING BASED USER TARGETING

(71) Applicant: Wrench.ai, Inc., Salt Lake City, UT (US)

(72) Inventor: Daniel J. Baird, Salt Lake City, UT (US)

(73) Assignee: WRENCH.AI, INC., Salt Lake City, UT (US)

( * ) Notice: Subject to any disclaimer, the term of this patent is extended or adjusted under 35 U.S.C. 154(b) by 0 days.

(21) Appl. No.: 16/542,240

(22) Filed: Aug. 15, 2019

(65) Prior Publication Data

US 2021/0049628 A1 Feb. 18, 2021

(51) Int. Cl.
*G06Q 30/0204* (2023.01)
*G06N 20/00* (2019.01)
*G06Q 30/0201* (2023.01)
*G06Q 30/0241* (2023.01)

(52) U.S. Cl.
CPC ......... *G06Q 30/0204* (2013.01); *G06N 20/00* (2019.01); *G06Q 30/0201* (2013.01); *G06Q 30/0276* (2013.01)

(58) Field of Classification Search
None
See application file for complete search history.

(56) References Cited

U.S. PATENT DOCUMENTS

| | | | | |
|---|---|---|---|---|
| 2008/0153595 | A1* | 6/2008 | Chickering | G06Q 30/02 463/42 |
| 2009/0171748 | A1* | 7/2009 | Aven | G06Q 30/0256 705/14.54 |
| 2012/0004959 | A1* | 1/2012 | Benyamin | G06Q 30/0269 705/14.4 |
| 2012/0158518 | A1* | 6/2012 | Benyamin | G06Q 30/0269 705/14.66 |
| 2018/0121964 | A1* | 5/2018 | Zhang | G06Q 30/0269 |
| 2018/0158100 | A1* | 6/2018 | Barak | G06Q 30/0269 |
| 2018/0173763 | A1* | 6/2018 | Xia | G06F 16/9024 |
| 2018/0330192 | A1* | 11/2018 | Atasu | G06Q 30/02 |
| 2019/0114348 | A1* | 4/2019 | Gao | G06Q 30/0256 |
| 2019/0355008 | A1* | 11/2019 | Sewak | G06Q 30/0271 |
| 2020/0021873 | A1* | 1/2020 | Swaminathan | G06Q 30/0242 |
| 2020/0320112 | A1* | 10/2020 | Bansal | G06N 20/20 |

* cited by examiner

*Primary Examiner* — Michael J Sittner
(74) *Attorney, Agent, or Firm* — Kunzler Bean & Adamson

(57) ABSTRACT

Apparatuses, methods, program products, and systems are disclosed for machine learning based user targeting. An apparatus includes one or more memory devices in communication with one or more processing devices. An apparatus includes a subject module that receives subject data associated with a subject. Subject data includes data that describes a subject. An apparatus includes an affinity module that determines, using a machine learning model, an affinity level of each of one or more entities in relation to a subject. Subject data is provided as input to a machine learning model. An apparatus includes a campaign module that generates one or more promotional campaign strategies for a subject based at least in part on an affinity level of each of one or more entities in relation to a subject. One or more promotional campaign strategies target a subject to one or more entities.

21 Claims, 8 Drawing Sheets

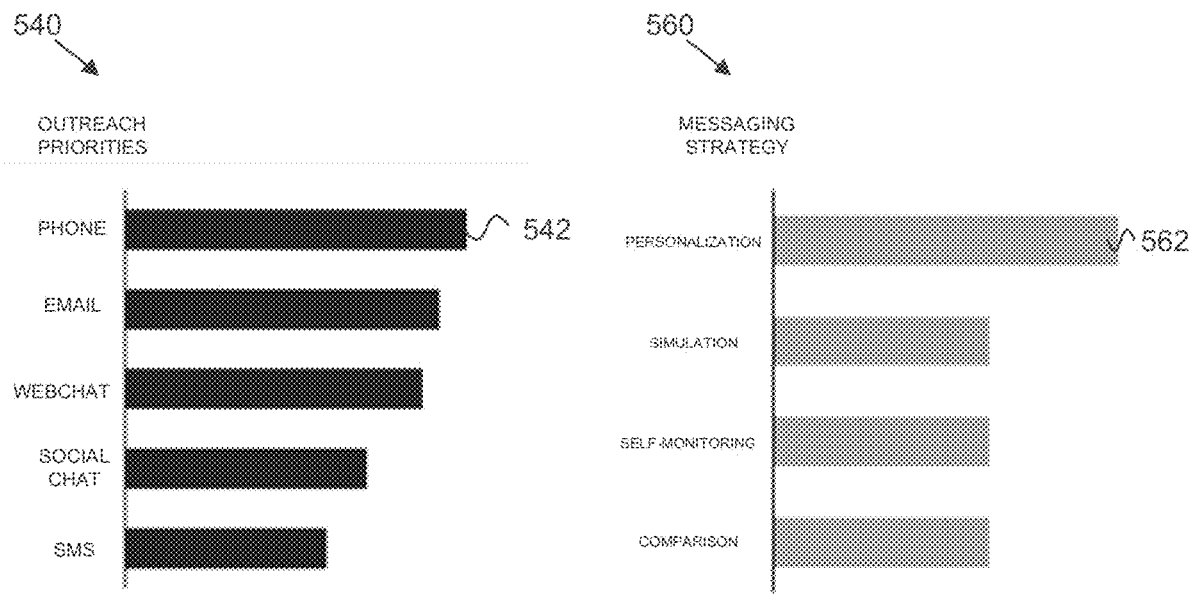
FIG. 5C
FIG. 5D
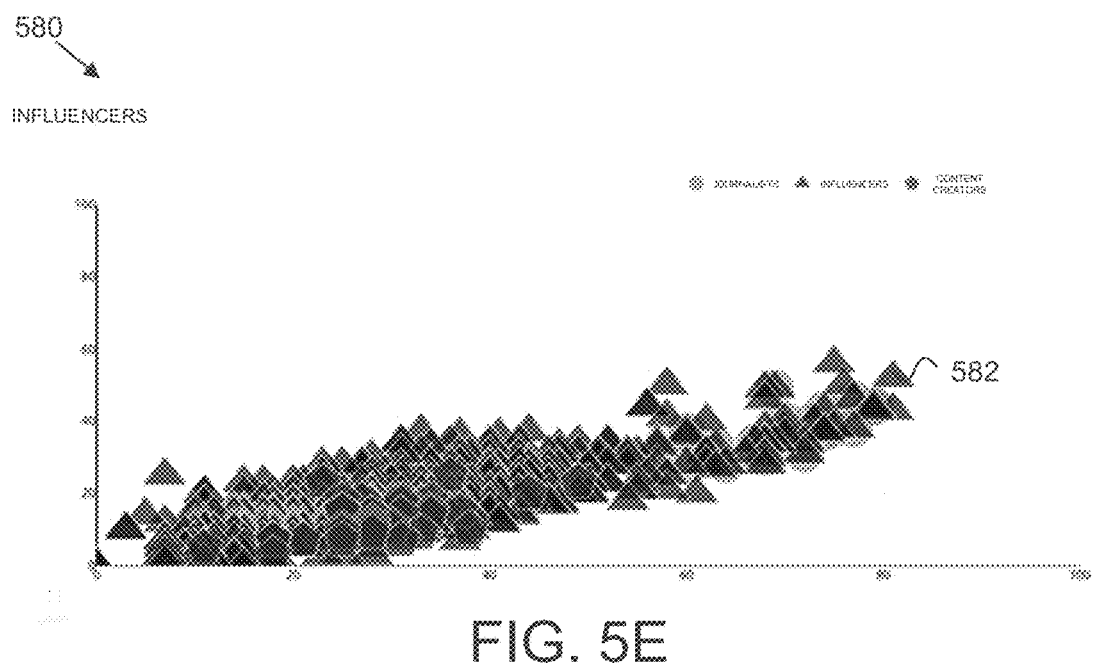
FIG. 5E

MACHINE LEARNING BASED USER TARGETING

FIELD

This invention relates to targeting users and more particularly relates to targeting users using machine learning.

BACKGROUND

Identifying users who are potential customers for products or services and determining effective marketing messages and channels to contact and persuade the potential customers is a persistent, time-consuming, and expensive challenge for providers of products and services. Technologies such as the Internet and social media have enabled advances in capabilities for identifying potential customers and their likely interest in a respective product or service. However, identifying potential customers and their interests and determining messaging strategies and channels for reaching out to them and persuading them still tends to involve substantial investments in manual searching, research, and outreach efforts, and yields relatively low sales conversion rates.

SUMMARY

An apparatus for machine learning based user targeting, in one embodiment, includes one or more memory devices in communication with one or more processing devices. An apparatus, in some embodiments, includes a subject module that receives subject data associated with a subject. Subject data may include data that describes a subject. An apparatus, in further embodiments, includes an affinity module that determines, using a machine learning model, an affinity level of each of one or more entities in relation to a subject. Subject data may be provided as input to a machine learning model. An apparatus, in certain embodiments, includes a campaign module that generates one or more promotional campaign strategies for a subject based on an affinity level of each of one or more entities in relation to a subject. One or more promotional campaign strategies may target a subject to one or more entities.

A method for machine learning based user targeting includes, in one embodiment, receiving, by one or more processing devices, subject data associated with a subject. Subject data may include data that describes a subject. A method, in further embodiments, includes determining, by one or more processing devices, using a machine learning model, an affinity level of each of one or more entities in relation to a subject. Subject data may be provided as input to a machine learning model. A method, in certain embodiments, includes generating, by one or more processing devices, one or more promotional campaign strategies for a subject based on an affinity level of each of one or more entities in relation to a subject. One or more promotional campaign strategies may target a subject to one or more entities.

A computer program product for machine learning based user targeting includes a tangible computer-readable storage medium having program code embodied therein. In one embodiment, the program code is executable by one or more processing devices for receiving subject data associated with a subject. Subject data may include data that describes a subject. In further embodiments, the program code is executable by one or more processing devices for determining, using a machine learning model, an affinity level of each of one or more entities in relation to a subject. Subject data may be provided as input to a machine learning model. In certain embodiments, the program code is executable by one or more processing devices for outputting, for display, a visual representation of the affinity level of each of one or more entities in relation to the subject.

A method for machine learning based user targeting includes, in one embodiment, receiving, by one or more processing devices, subject data associated with a subject. Subject data may include data that describes the subject. A method, in further embodiments, includes determining, by one or more processing devices, using a machine learning model, an affinity level of each of one or more entities in relation to a subject. Subject data may be provided as input to the machine learning model. A method, in certain embodiments, includes outputting for display, by one or more processing devices, a visual representation of an affinity level of each of one or more entities in relation to a subject.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 5C depicts one example embodiment of an interface for machine learning based user targeting;

FIG. 5D depicts an example embodiment of another interface for machine learning based user targeting;

FIG. 5E depicts an example embodiment of an interface for machine learning based user targeting;

DETAILED DESCRIPTION

Figure 1:
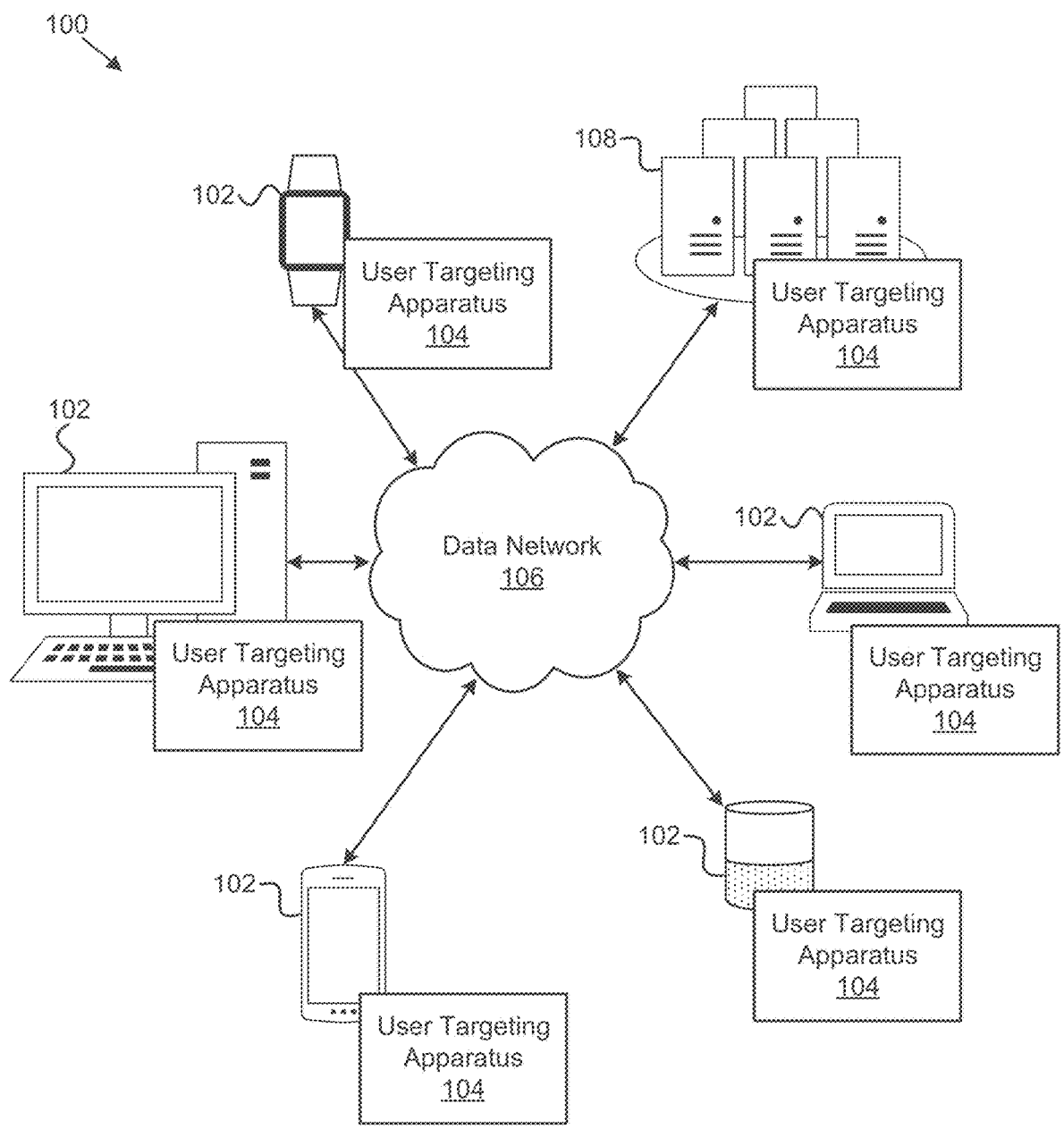
FIG. 1 is a schematic block diagram illustrating one embodiment of a system for machine learning based user targeting.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on one or more computer readable medium(s). Furthermore, one or more processing devices may implement all possible embodiments of the recited modules described herein, and may include processors, processor cores, ASICs, FPGAs, and/or other types of processing devices described herein.

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

FIG. 1 is a schematic block diagram illustrating one embodiment of a system 100 for machine learning based user targeting. In one embodiment, the system 100 includes one or more information handling devices 102, one or more user targeting apparatuses 104, one or more data networks 106, and one or more servers 108. In certain embodiments, even though a specific number of information handling devices 102, user targeting apparatuses 104, data networks 106, and servers 108 are depicted in FIG. 1, one of skill in the art will recognize, in light of this disclosure, that any number of information handling devices 102, user targeting apparatuses 104, data networks 106, and servers 108 may be included in the system 100.

In one embodiment, he information handling devices 102 may include one or more of a desktop computer, a laptop computer, a tablet computer, a smart phone, a smart speaker (e.g., Amazon Echo®, Google Home®, Apple HomePod®), a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, may include processors, processor cores, and/or the like that are configured to execute various programs, program code, applications, instructions, functions, and/or the like for processing text, executing machine learning and/or artificial intelligence models, sending electronic messages, displaying information in one or more graphical formats on a graphical user interface, connecting to a network such as the Internet to access social media sites and other websites that includes publicly available information, and/or the like.

In one embodiment, the user targeting apparatus 104 is configured to receive subject data associated with a subject such as a product or service, determine an affinity (e.g., a knowledge or interest) of entities (e.g., a person, company, organization, or the like) in the subject using a machine learning or artificial intelligence model, and generate promotional campaign strategies for targeting the subject to the entities based on the affinity of the entities for the subject. The user targeting apparatus 104, including its various sub-modules, may be located on one or more information handling devices 102 in the system 100, one or more servers 108, one or more network devices, and/or the like. The user targeting apparatus 104 is described in more detail below with reference to FIGS. 2 and 3.

In one embodiment, the user targeting apparatus 104 improves upon conventional methods for generating or creating promotional campaigns for a product or service by using machine learning models, which are trained on large sets of publicly available data for both potential customers and products/services. The user targeting apparatus 104, in various embodiments, uses machine learning to identify, segment, and rank potential customers with reference to a target product, service, or other offering. Furthermore, the user targeting apparatus 104 leverages machine learning to craft individual, personalized outreach messages for each potential customer. The machine learning modules may also be used to prepare and expand machine learning training data and perform category-specific supervised fine-tuning of the machine learning model, thereby generating category-specific fine-tuned language models to improve natural language understanding outputs specific to targeted categories of marketing campaigns. Accordingly, promotional outputs can include identified and ranked potential customers for a selected offering (e.g., product or service) and respective individually personalized promotional outputs and channels for the identified and ranked potential customers.

In various embodiments, the user targeting apparatus 104 may be embodied as a hardware appliance that can be installed or deployed on an information handling device 102, on a server 108, or elsewhere on the data network 106. In certain embodiments, the user targeting apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the user targeting apparatus 104 may include a power interface, a wired and/or wireless network interface, a graphical interface that attaches to a display, and/or a semiconductor integrated circuit device as described below, configured to perform the functions described herein with regard to the user targeting apparatus 104.

The user targeting apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the user targeting apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the user targeting apparatus 104.

The semiconductor integrated circuit device or other hardware appliance of the user targeting apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the user targeting apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada. The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The servers 108 may be configured or optimized for executing machine learning algorithms one a single server 108 or using a distributed or cluster architecture that employs a plurality of servers 108. The servers 108 may be located in a data center or in different geographical locations that are accessible to one or more other servers 108 or information handling devices 102 via a data network 106 or the "cloud".

Figure 2:
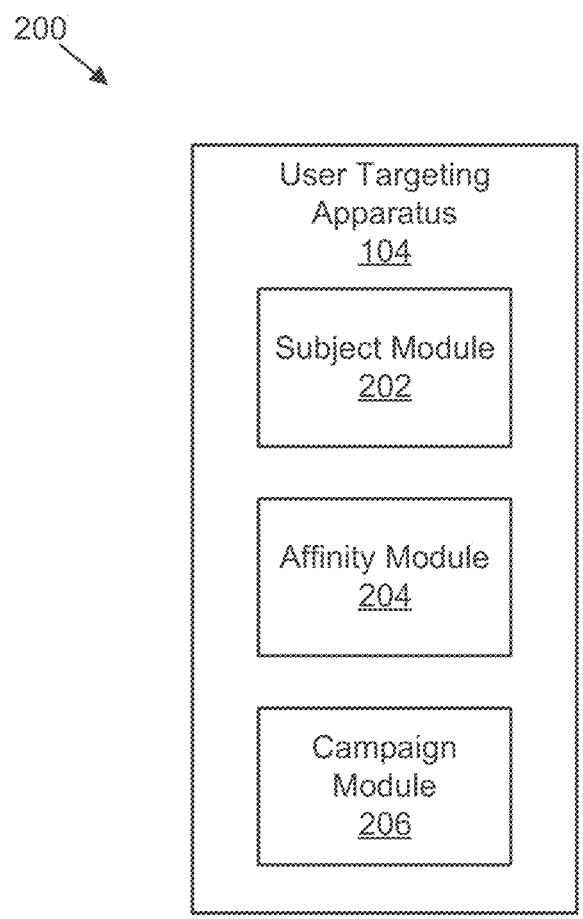
FIG. 2 is a schematic block diagram illustrating one embodiment of an apparatus for machine learning based user targeting.

FIG. 2 is a schematic block diagram illustrating one embodiment of an apparatus 200 for machine learning based user targeting. In one embodiment, the apparatus 200 includes an instance of a user targeting module 104. The user targeting module 104, in certain embodiments, includes one or more instances of a subject module 202, an affinity module 204, and a campaign module 206, which are described in more detail below.

In one embodiment, the subject module 202 is configured to receive subject data associated with a subject. As used herein, a subject may refer to a product, a service, an offering, a brand, an industry, and/or the like that an entity such as a customer, user, organization, company, promoter, or the like can purchase, use, be made aware of, or otherwise consume. In some embodiments, the subject data comprises data that describes the subject such as a text description of the subject, images of the subject, videos of the subject, audio descriptions of the subject, and/or the like.

In certain embodiments, the subject module 202 accesses, scrapes, parses, and/or the like subject data from one or more websites. For example, the subject module 202 may perform a search on Amazon.com® for a product and download, scrape and/or parse the resulting website that includes the product description from Amazon.com®. Similarly, the subject module 202 may enter a search term or phrase in a search engine such as Google® and scrape the results for a product description or a link to a website with the corresponding product description.

In some embodiments, the subject module 202 determines a manufacturer of the product or a company providing a service and may go directly to their website to download, scrape, or parse the product information from their website. In some embodiments, the subject module 202 receives product or service description data from a user. For example, a user may enter text data describing the product and/or may upload images of the product for use as subject data.

The descriptive information may include size specifications for a product, colors of the product, the type of the product (e.g., sport, camping, electronics, etc.), other products that are necessary or optional to use the product, similar products, a cost of the product, and/or the like. Similarly, the descriptive information for a service may include a cost of the service, the type of service, the service industry, and/or the like.

In one embodiment, the affinity module 204 is configured to determine, using a machine learning model, an affinity level of each of one or more entities in relation to the subject. As used herein, an entity may refer to a user, customer, potential customer, client, company, organization, public agency, government agency, municipality, non-profit organization, promoter, marketers, sales contacts, and/or the like that may be a consumer or user of a subject—a product or service that is offered. Accordingly, an affinity level may refer to a level of knowledge, interest, background, experience, education, and/or the like that an entity has with a subject. Entities with high affinity for a particular subject may not necessarily be interested in the subject but may be qualified to rapidly respond to inquiries to indicate whether they are interested in the subject and may be likely to provide referrals to interested parties for the subject.

As described in more detail below, a machine learning model may be trained on entity data and/or subject data and used to determine an affinity level of a plurality of entities that may be potential consumers of the subject. As used herein, machine learning may refer to data analysis that automates analytical model building. It is a branch of artificial intelligence based on the idea that systems can learn from data, identify patterns and make decisions with minimal human intervention. As it relates to the subject matter herein, a machine learning model may be trained on some training data for entities and/or subjects to then process new or additional data, e.g., subject data to may predictions, e.g., the affinity level of entities for a particular subject or multiple subjects.

Thus, in certain embodiments, the affinity module 204 provides the subject data that the subject module 202 receives to the machine learning model, e.g., as inputs into the machine learning model executing on an information handling device 102 and/or a server 108 using an API or other interface into the machine learning model. The affinity module 204 may set certain parameters, filters, and/or other criteria to configure the machine learning model such as setting weights on particular characteristics of an entity or the subject (e.g., more heavily weighting experience over education).

The machine learning model may be used to determine measures of similarity, such as mathematical or digital encodings of semantic similarity, among the text descriptions of the entities and subjects, that may be indicative of measures of affinity between the entities and the subjects, and the context of the interaction, e.g., prospective customers vs. professionals. In certain embodiments, the affinity module 204 receives the results of the machine learning model and interprets the results as a level of affinity for the subject for each of the entities that the machine learning model has been trained on.

The affinity level that the machine learning model generates may be a number, ranking, value, string, character (e.g., emoji, a number of stars, or the like), factor, weight, or some other identifier that indicates the affinity that an entity has with the subject. For instance, the affinity levels may be a value within a scale from 1 to 10, with 10 being the highest affinity an entity can have with a subject and 1 being the lowest. As described in more detail below, the affinity level can be used to segment the entities into different entity types (e.g., innovators, influencers, early adopters, late adopters, laggards).

In certain embodiments, the subject module 202 receives subject data for multiple different subjects, which can be used to determine affinities of entities with more than one subject. In such an embodiment, the affinity module 204 determines, using the machine learning model, affinity levels between a plurality of subject text data associated with multiple subjects and the entity text data that the machine learning model is trained on.

In some embodiments, the affinity module 204 exports at least a portion of the measures of affinity between the respective entities and the subject, or a ranked list of at least a portion of the entities ranked in order of the measures of affinity between the respective entities and the subject, to external systems, programs, or the like such as a customer relationship management ("CRM") system.

In one embodiment, the campaign module 206 is configured to generate one or more promotional campaign strategies for the subject based on the affinity level of each of the one or more entities in relation to the subject. As used herein, a promotional campaign may refer to one or more targeted marketing, advertising, or the like campaigns or promotions for targeting a subject to one or more entities. A promotional campaign strategy may include a particular type of messaging, the content of the messaging, advertising/marketing channel, time/location to target an entity, and/or the like.

The promotional campaign strategy may be based on or determined by the affinity levels of the one or more entities with the subject. In other words, the campaign module 206 determines an individualized, personalized marketing or advertising campaign for each entity that the subject is being promoted or offered to (e.g., a product/service sales campaign versus an awareness campaign). For example, the campaign module 206 may determine that an entity that is an influencer for new electronic devices, indicating a high affinity level with new electronic devices, should be targeted with personalized messages and/or free samples of the electronic devices to create awareness for the new electronic devices as part of an awareness campaign whereas a late adopter of new electronic devices should be targeted with traditional advertising (e.g., web, television) sometime after the electronic device has been in the market for a period of time to generate sales of the new electronic device.

In this manner, the user targeting module 104, which is described in more detail below with reference to FIG. 3, can determine personalized and individualized campaign strategies for targeting specific users for a product/service using trained machine learning models. Furthermore, the user targeting module 104, in combination with the machine learning model(s), is applicable to any kinds of promotional activities for matching any product/service to any entity because the affinity levels can be determined based on the campaign results and publicly available data. Moreover, the user targeting module 104 may be further specialized using proprietary data held by a particular entity to generate a domain-specific campaign strategy, which is described in more detail below.

Figure 3:
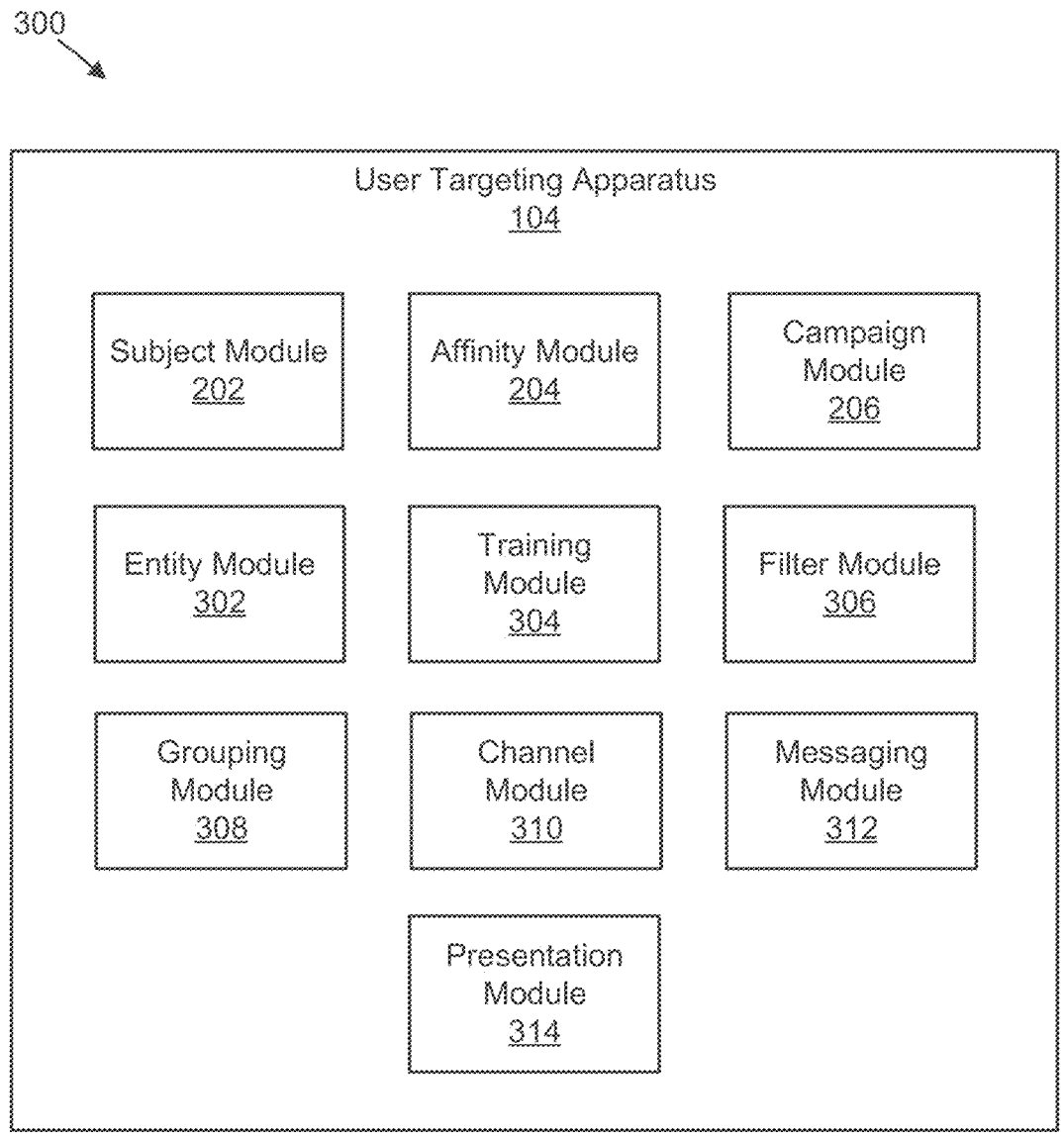
FIG. 3 is a schematic block diagram illustrating one embodiment of another apparatus for machine learning based user targeting.

FIG. 3 is a schematic block diagram illustrating one embodiment of another apparatus 300 for machine learning based user targeting. In one embodiment, the apparatus 300 includes an instance of a user targeting module 104. The user targeting module 104, in certain embodiments, includes one or more instances of a subject module 202, an affinity module 204, and a campaign module 206, which may be substantially similar to the subject module 202, the affinity module 204, and the campaign module 206 described above with reference to FIG. 2. Furthermore, in certain embodiments, the user targeting module 104 includes one or more of an entity module 302, a training module 304, a filter module 306, a grouping module 308, a channel module 310, a messaging module 312, and a presentation module 314, which are described in more detail below.

In one embodiment, the entity module 302 is configured to access, download, scrape, parse, read, and/or the like one or more online sources, e.g., websites for entity data associated with one or more entities. The entities may be defined by a user, may be read from a CRM or other entity management system, may be based on social networking relationships (e.g., LinkedIn® connections of a user or connections of connections of a user, and so on), and/or the like. In certain embodiments, the entity data includes text data that describes the one or more entities. Other data may be included such as image data, video data, audio data, and/or the like. The entity module 302 may access sources of entity data that includes public-facing social media sites for users or companies (e.g., Facebook® pages, Twitter® feeds, LinkedIn®, and/or the like), public information provided by a government agency (e.g., filings with the Security and Exchange Commission), blog posts by journalists/bloggers/content creators, podcasts, video reviews, online reviews by an entity, publicly available demographic information (e.g., address, age, and/or the like), political affiliation, military service record, church affiliation, and/or the like.

In such an embodiment, the entity module 302 may employ a web crawler or other algorithm/command (e.g., GNU "wget" CLI command) to access, query, download, and parse publicly available websites associated with entities. In some embodiments, the entity module 302 uses previously received and/or stored electronic credentials for a user to access information associated with the user from websites where it is required to provide credentials (e.g., a username and password).

The entity module 302 may be configured to automatically import substantial amounts of text data sets describing entities and subjects to model in machine learning language models. An example data import infrastructure may enable extract, transform, load ("ETL") functions (referring to the database functions that may be combined into one command/tool to pull data out of one database and place it into another database), data cleansing, and data pre-processing. An example data import infrastructure may enable an example system to import one or more of the entity text data sets from a source selected from one or more of a CRM account, a social media platform, a data source provided by the U.S. Securities and Exchange Commission ("SEC"), a commercial data source, and/or the like.

For example, the entity module 302 may be configured to automatically download entity text data sets specific to financial and corporate categories from SEC sources providing text data on all registered financial advisors, all broker-dealers, and/or corporate filings that can be parsed to yield data on all directors and officers of publicly-traded companies. As another example, the entity module 302 may be configured to identify multiple social media accounts linked to a single person or other entity, ingest existing biographical and social posting text information from the accounts, and proceed with a social listening mechanism to update the entity text data set for the entity with future social media posts. The entity module 302 may be configured to import data using an API key and a webhook, for example.

The entity module 302 may further supplement the entity information from the online sources with company-, organization-, or domain-specific data for one or more entities. The domain-specific data may include customer relationship management ("CRM") data, sales data, item-level sales data, internal product/service reviews/feedback, and/or the like. In such an embodiment, the entity data may further include an entity's purchases, purchase history, and/or the like that may be used to determine whether a subject corresponds with a purchasing pattern or lifecycle for the user (e.g., whether the user is transitioning from an early adopter to a late adopter), and use that data to generate specific campaign recommendations tailored to that entity's purchasing pattern.

The entity module 302 may classify the entity data text into two or more classifications of similarity with the subject data for multiple different subjects. In such an embodiment, visual representations of measures of affinity between the respective entities and the subject may include indications of two or more classifications of affinity between the respective entities and the subject, based at least in part on the classifications of similarity of the entity text data with the subject data. The entity module 302 may distinguish between the classifications by performing text classification of the entity text data with respect to the subject data to evaluate whether or not the entity text data are indicative of entities who are industry professionals in at least one of the selected subjects. The visual representation of measures of affinity between the respective entities and the subjects may thus include indications of whether or not the entities are industry professionals.

In one embodiment, the training module 304 is configured to train the machine learning model. The machine learning model may be used as part of a machine learning algorithm such as supervised or unsupervised machine learning. The machine learning model, for instance, may include an artificial neural network, a decision tree, a support vector machine, a Bayesian network, a genetic algorithm, a federated learning model, and so on.

In a specific embodiment, the machine learning model is a high-dimensional tensor model that is trained on a language corpus in a machine learning training process. Initially, as a baseline, the training module 304 may train the machine learning model on one or more corpora of text data such that the machine learning model is a machine learning language model for performing natural language processing and natural language understanding. As used herein, a corpus may refer to a collection of written texts such as the entire works of a particular author or a body of writing on a particular subject. Corpora may be based on, for example, millions, hundreds of millions, or other large numbers of news articles, encyclopedic articles, web pages, or other text examples. Types of corpora may include a monolingual corpus, a parallel corpus, a comparable corpus, a learner corpus, and/or the like. In further embodiments, the training module 304 further trains and refines the machine learning model with domain-specific entity data, for example, CRM data.

In various examples, the machine learning model may include tens, hundreds, thousands, or more of dimensions. Some embodiments of the machine learning model may be implemented with vector models, which are a subset of tensor models where vectors are first-order tensors. In other example embodiments, the machine learning model may be implemented with higher-order tensors. Other examples may include named entity recognition, sentiment analysis, topic modeling, and/or the like. Determining an affinity level between the subject text data and the entity text data for each entity may include generating a tensor representation of the subject text data in the machine learning model and determining the measures of similarity in the machine learning model between the tensor representation of the subject text data and tensor representations of the entity text data for each entity.

The machine learning model may be generated and/or fine-tuned using one or more of a long short-term memory ("LSTM") neural network, a recurrent neural network, a convolutional neural network, a gated recurrent unit neural network, a generative adversarial network, a transformer network, and an attention mechanism or attention-memory mechanism. The machine learning model may further be generated and/or fine-tuned using any of various techniques such as semi-supervised sequence learning, deep contextualized word representations, universal language model fine-tuning ("ULMFiT"), or other machine learning model enhancing or refining techniques.

In some examples, the training module 304 may train a machine learning model in an initial machine learning training process (e.g., using a corpus of text data), and further train the machine learning model with a generative adversarial network or other machine learning architecture that uses fine-tuned artificial training data that is not contained in the initial training data set used in the initial machine learning training process. While different machine learning networks, models, and techniques have differences in performance for sets of text of different lengths, with some performing better on short sequences of text and others offering better performance on long sequences of text, some example machine learning systems as they relate to the subject matter disclosed herein may be created and/or fine-tuned using machine learning networks, models, and techniques that offer strong performance on sequences of text typical of the text data sets used to describe the entities and subjects of interest in the systems herein.

In various examples, the machine learning system for the subject matter disclosed herein may include pre-processing, post-processing, and/or rules applications of the text data in combination with machine learning techniques to further enhance the accuracy and performance of the overall machine learning model. The machine learning model, therefore, may operate not just with natural language processing ("NLP"), but also with natural language understanding ("NLU").

The training module 304, in certain embodiments, further trains the machine learning model using results or feedback from one or more promotional campaigns for the subject. The results/feedback, for instance, may include information provided by one or more entities with respect to the subject such as positive feedback, sales conversions, referrals, callbacks, meetings or appointments that are setup with an entity, and/or the like. Negative feedback may include no responses, negative responses, little to no referrals, conversions, call-backs, meetings, or appointments, and/or the like. The training module 304 may iteratively provide the feedback to the machine learning model to further refine the machine learning model and ultimately the campaign strategy for a subject. In this manner, the machine learning model is further trained and refined on domain-specific marketing and/or sales data to create a marketing and/or sales domain-specific fine-tuned language model specially adapted to generate predictions of marketing and/or sales results for respective entities with respect to respective subjects. In certain embodiments, the feedback may include an indication of whether a result is a false positive. For example, the machine learning model may determine that an entity has an affinity level that indicates the entity is an early adopter, where in practice the entity is a late adopter as indicated based on feedback from the entity or from campaign results associated with the entity.

The training module 304 may further include or provide a data collection infrastructure that determines the marketing and/or sales results data from a domain-specific system, e.g., a CRM system and feed the marketing and/or sales results data to the marketing and/or sales domain-specific fine-tuned language model on an ongoing basis, at either a periodic, aperiodic, or a continuous rate, thereby enabling further ongoing machine learning training of the marketing and/or sales domain-specific fine-tuned language model. In this manner, the machine learning model may be a driver of ever-increasing specialist accuracy and intelligence while being able to predict affinities and drive desired results for marketing and/or sales campaigns with a unique and proprietary training data set that generates ever-increasing improvements in a specialized, marketing and sales domain-specific machine intelligence system.

In certain embodiments, the machine learning model 304 may be trained and refined on entity and subject data without persistently storing the data. For instance, CRM and customer data platforms can offload personally identifiable data after converting to de-risked data points (e.g., data points that do not contain personally identifiable information) that are more valuable to the marketing or sales team. In this manner, risk of data breaches can be offloaded and hoarding data points with no actionable insight potential can be prevented in exchange for complex, but meaningful insights that are only useful to the specific team searching for insight into selected entities' behaviors in certain, narrow, domain-applicable contexts. Considering new, but highly impactful legislation like the European Union's General Data Protection Regulation ("GDPR") and California's California Consumer Privacy Act ("CCPA") acts, extracting actionable insights while offloading data that carries high risk becomes an ever increasingly important and valuable way to handle personal information even if it originates from a public source.

In one embodiment, the filter module 306 is configured to filter the entity data based on one or more provided filter criteria prior to training the machine learning model. The filter module 306 may receive one or more criteria for a filter for the entity data such as education level, number of years working, age, industry, location, and/or the like. For instance, a user may limit or filter the entity data to all potential customers who have a bachelor's degree and are 35 years old or older. The machine learning model may then be trained on the filtered entity data.

In one embodiment, the grouping module 308 is configured to assign each of the one or more entities to one or more groups based on the affinity level for each of the one or more entities. In other words, the grouping module 308 segments the entities into one or more different groups, classifications, cliques, sets, and/or the like according to the affinity level for each of the entities.

For instance, entities may be assigned to a segment if their affinity scores satisfy a threshold cutoff for a segment. In one embodiment, the one or more segments includes influencers, early adopters, late adopters, innovators, and laggards. Accordingly, in one example embodiment, on a scale of 1-100, the influencers may have affinity level scores of 76-100, the early adopters may be on the scale from 51-75, the late adopters may be on the scale from 26-50, and the laggards may have affinity scores from 1-25. Thus, the grouping module 308 groups or segments the entities based on where their affinity scores fall within the scale.

In one embodiment, the channel module 310 is configured to determine, as part of the one or more promotional campaign strategies, one or more marketing channels for targeting the subject to the one or more entities based on the affinity levels of the one or more entities. A marketing channel may include a medium for advertising the subject to an entity. The medium may include telephone marketing, email marketing, a text message, a social media post or advertisement, a banner ad in a website, a push notification, a video, an audio message, a letter sent in the mail, a television advertisement, a YouTube advertisement, a Google advertisement, and/or the like.

For instance, based on the target segment, the machine learning model may determine the best or most effective marketing channel for each entity in the segment according to other factors associated with the entities. For example, a potential customer that is a laggard and is 85 years old may not use any form of electronic communication, so a telephone call, a television ad, or sending a letter in the mail or inserting a mailer in the mail may be the most effective way to reach the potential customer. On the other hand, a potential influencer that is 25 years old may only be accessible on social media such as Instagram® using direct messages. The machine learning model is able to provide personalized recommendations for marketing channels on a per-entity basis based on the public and domain-specific data that it is trained on and the description/type of subject that is being offered.

In one embodiment, the messaging module 312 is configured to determine, as part of the one or more promotional campaign strategies, a messaging strategy for contacting the one or more entities to promote the subject to the one or more entities based on the affinity levels of the one or more entities and one or more measures of effectiveness of different types of messages and messaging channels that the machine learning model generates for the one or more entities.

For instance, the messaging module 312 may determine measures of messaging effectiveness of a plurality of messaging strategies for the entities (e.g., based on feedback from messaging strategies used in previous promotional campaigns), and output for display, for each of a plurality of the entities, an indication of at least one of the messaging strategies for a respective entity determined to have a highest messaging effectiveness. The messaging module 312 may determine the measures of similarity between the entity text data and the indicators of effectiveness of the plurality of messaging strategies based at least in part on indicators of personality type, job function, entity age, and or the like.

The messaging module 312 may use a machine learning model that is trained on messaging effectiveness results data, for example, and specify the messaging effectiveness indicators that are desired. The messaging module 312 may, for example, use text data that describes indicators of personality types such openness, conscientiousness, extraversion, agreeableness, and neuroticism, to determine a semantic similarity, using the machine learning model, between the text data that describes indicators of personality types with the text data that describes the entities.

The messaging module 312 may output for display, for each of a plurality of the entities, a list of the messaging strategies in an order ranked by the determined messaging effectiveness. The messaging module 312 may select personalized message strategies from among a plurality of messaging strategies comprising at least a comparison strategy (comparison with competitors), a self-monitoring strategy (that measures the magnitude of the impact of the subject (e.g., product) on an entity (e.g., individual)), a cooperation strategy, a personalization strategy, a simulation strategy, and a praise strategy.

The messaging module 312 may, for a selected entity, generate a modifiable template for an outreach message to the selected entity that implements a selected messaging strategy from among the messaging strategies. As one example, the messaging module 312 may indicate that a personalized comparison strategy that targets consumer entities who have high affinity for a product category as being the highest ranked effectiveness messaging strategy (the personalized comparison strategy includes favorably comparing a product that is the subject of the user's marketing campaign with the targeted consumers' favorite comparable product in the product category). As another example, the messaging module 312 may indicate a self-monitoring strategy where offering data and analytical rationales has the highest messaging effectiveness for a marketing campaign aimed at angel investors and/or family office investors.

In some embodiments, the messaging module 312 determines measures of messaging effectiveness of a plurality of messaging channels for the entities. The messaging module 312 may, for example, determine an indication of at least one of the messaging channels for a respective entity determined to have a highest messaging effectiveness. The messaging module 312 may determine the measures of similarity between the entity text data and the indicators of effectiveness of the plurality of messaging channels based at least in part on at least one of indicators of personality type, job function, entity age, and/or the like for the entity text data. The messaging module 312 may determine, for each of a plurality of the entities, a list of the messaging channels in an order ranked by the determined messaging effectiveness. The personalized messaging channels may be selected from among a plurality of messaging channels comprising at least email, telephone, text message, messaging application message, instant message, push notifications, and social network message.

In another example, the messaging module 312 may receive requirements, rules, criteria, or the like (e.g., from a user via a user interface) for marketing campaigns targeted for creating awareness of a subject instead of, or in addition to, selling a subject such as prior to a product launch, messaging may be targeted at journalists, bloggers, content creators, influencers (e.g. social media influencers), and/or other promoters and likely providers of publicity who may be likely to evangelize, promote, and amplify a marketing awareness campaign for the subject.

Thus, the messaging module 312 may utilize the determined affinity levels of the entities with the subject to generate messaging content and select messaging channels for a marketing awareness campaign. The messaging module 312, for instance, may determine measures of messaging influence among the entities with respect to the subject using the machine learning model. The indicators of messaging influence may include indicators that entities with which the entity text data is associated are journalists, bloggers, content creators, and/or other influencers having an affinity with the subject. The messaging module 312 may output for display a visual representation of measures of affinity between the journalists, bloggers, content creators, and other influencers, and the subject based at least in part on the measures of messaging influence among the entity text data with respect to the subject. The messaging module 312, for instance, may use the machine learning language model to measure semantic similarities between entity data sets and trained indicators of entity status as a journalist, blogger, content creators, or influencer to determine such status.

The messaging module 312 may also evaluate promoters according to their affinity levels with multiple subjects, which can be useful for generating marketing campaigns for subjects that have relevance to a crossover of two subjects. The messaging module 312 may determine measures of messaging influence among the entity text data with respect to the first subject and measures of messaging influence among the entity text data with respect to a second subject. The messaging module 312 may provide and/or output, for display, graphical representations of the journalists, bloggers, content creators, and/or other influencers at positions in a graph with a first coordinate along a first axis corresponding to the measures of messaging influence among the entity text data with respect to the first subject and with a second coordinate along a second axis corresponding to the measures of messaging influence among the entity text data with respect to the second subject.

Figure 5A:
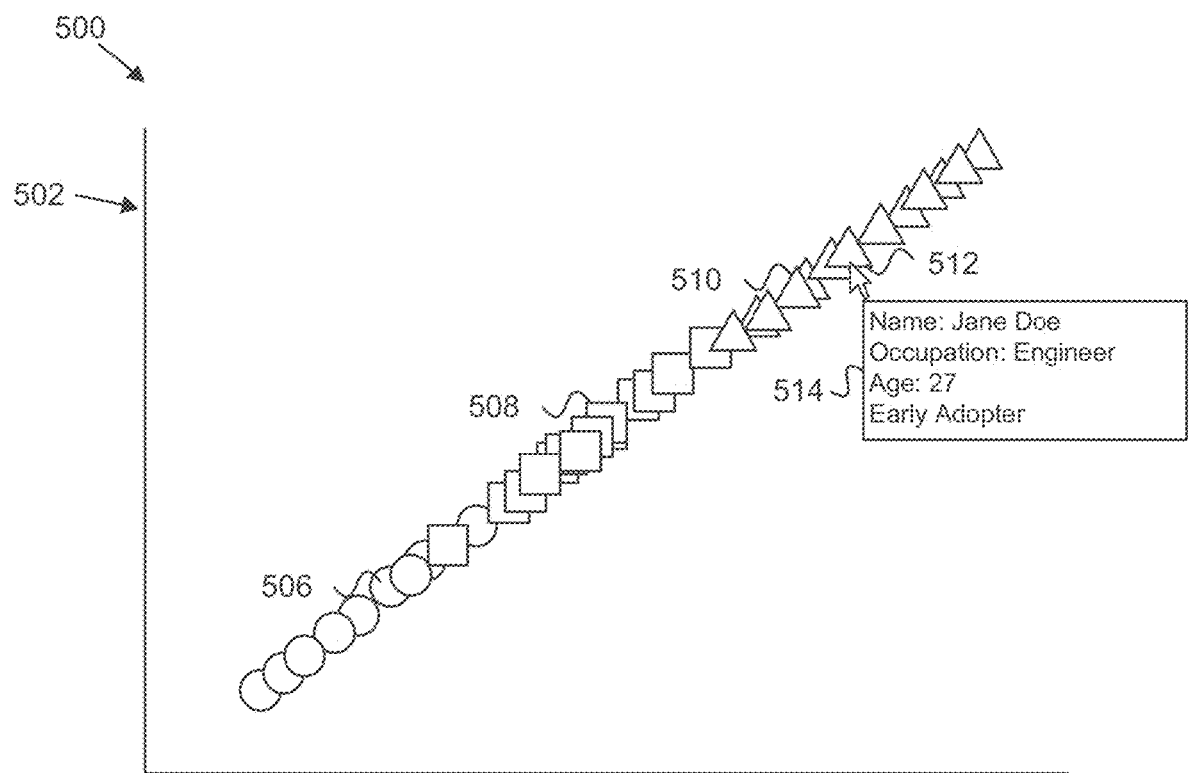
FIG. 5A depicts one example embodiment of an interface for machine learning based user targeting.
Figure 5B:
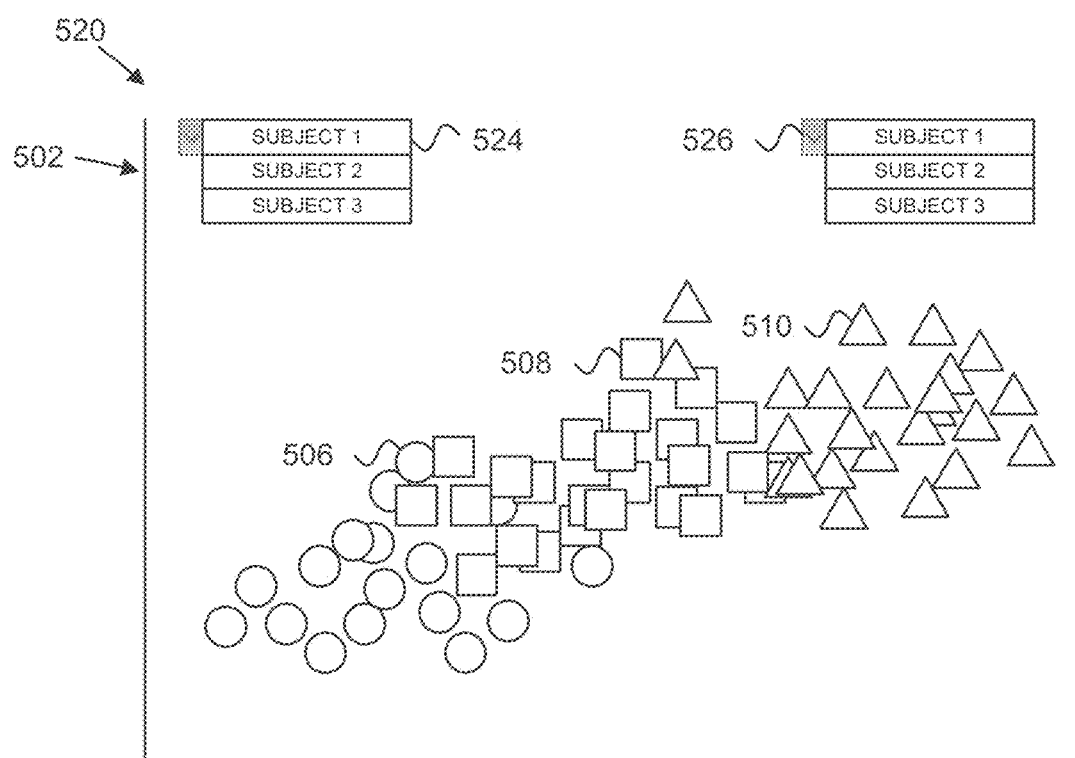
FIG. 5B depicts an example embodiment of another interface for machine learning based user targeting.

In one embodiment, the presentation module 314 is configured to generate interactive graphical representations of the affinity level for each of the one or more entities in relation to the subject. For instance, the presentation module 314 may generate a graph that displays a graphical representation of each entity that is used in the machine learning model for the promotional campaign and their affinity for the subject (as shown in FIGS. 5A and 5B below).

In certain embodiments, a user may select, hover over, click on, tap, or the like a graphical representation of an entity to view additional information about the entity such as the entity's affinity level, demographic information, segmentation group, and/or the like. The presentation module 314 may use different graphical representations of the entities dependent on which segmentation group the entities are assigned to (e.g., influencers, early adopters, late adopters, laggards, or the like).

The presentation module 314 may present other graphical interfaces such as a chart of messaging types and effectiveness, ranked, for each entity that is selected in the foregoing graph. In further embodiments, the presentation module 314 may present messaging templates or other messaging content for a user to edit or modify and send to certain entities, if applicable (e.g., using an email channel, a text or SMS channel, a social media channel, a push notification, and/or the like) using the messaging module 312. The presentation module 314 may, for a selected entity, present more detailed information for the entity such as their LinkedIn® profile information, demographic information, recent social media posts, social media posts that are related to the subject, and/or the like.

The presentation module 314 may present interfaces for describing the machine learning model including the number of entities that the machine learning model is trained on, the type of machine learning model that is being used, a predictive accuracy of the machine learning model, and/or the like. The presentation module 314 may present menus and/or other interface elements that a user can interact with to select different settings such as a drop-down menu that lists different subjects that can be analyzed for promotional campaigns using the machine learning model, a menu to select different segments of entities to limit the presented information to a particular segment (e.g., early adopters), and/or the like.

The presentation module 314 may present an interface for receiving subject data. For example, the user can navigate to a subject text entry user interface on a dashboard of a web application and enter a description of the product. The user interface may prompt the user to enter subject details, jargon, and/or industry-specific terminology, which may enhance the descriptive specificity and the semantic accuracy of the machine learning model. In some embodiments, the presentation module 314 may provide selectable pre-existing entity and subject options from a menu and explore or navigate affinities of entities and subjects that are already stored from previously executed promotional campaigns using the machine learning model.

In some embodiments, marketing and sales professionals may use the graphical interfaces that the presentation module 314 generates to order their priorities and amounts of time and effort in accordance with the ranked order of contacts as depicted in the affinity graph interface as shown in FIGS. 5A and 5B. The interface may also include menus of filters to filter out all but a certain number of contacts with the highest rated affinities with a selected product or with the highest combined rated affinities with a selected product and a second selected category subject, such as an industry.

For instance, many companies and other entities may offer a product or service that is aimed at a crossover between a certain product category and a certain industry, for example, determining contacts' affinities for both of two subjects such as the product category and the certain industry. In another example, marketing professionals may implement a marketing campaign to contact a certain number of contacts with a threshold affinity for a subject or combination of subjects, such as the top 1,000 contacts in terms of their affinities for certain product categories and certain industries. In another example embodiment, sales professionals may use the output presented in the interfaces to reach out to sales contacts starting with the contact with the highest rated affinity for a given product and work their way down through the ranks of contacts with the next highest levels of affinity, and so on.

In some embodiments, the presentation module 314 graphs entities along different axes to represent both affinity for a product and influence in the corresponding product space. In some examples, the presentation module 314 makes a more fine-grained division of entities on the graph to optimize for a variety of more fine-grained iterative campaigns, addressing small, experimental and/or influence-building campaigns before rolling out larger campaigns to larger market segments or a full campaign to a general market.

As one example, fine-grained campaigns may include isolating a certain percentage of entities who are among the highest affinity and lowest influence, that might be selected for experimental campaign messages, so as to gauge which outreach messages are successful without significant effect on the larger market. In another example, a selected percentage of late adopters or low affinity entities, who may represent an ideal group to refine a complex message, can be isolated based on the determined affinities of the entities and as presented in the interfaces. In another example, once a product and its marketing messaging have been refined and deemed ready to advance to a market at large, members of the press and/or celebrity influencers can be identified from the entities and targeted with messaging that is tuned to seek endorsements and favorable press and social media coverage prior to launching a full campaign to the market at large.

Figure 4:
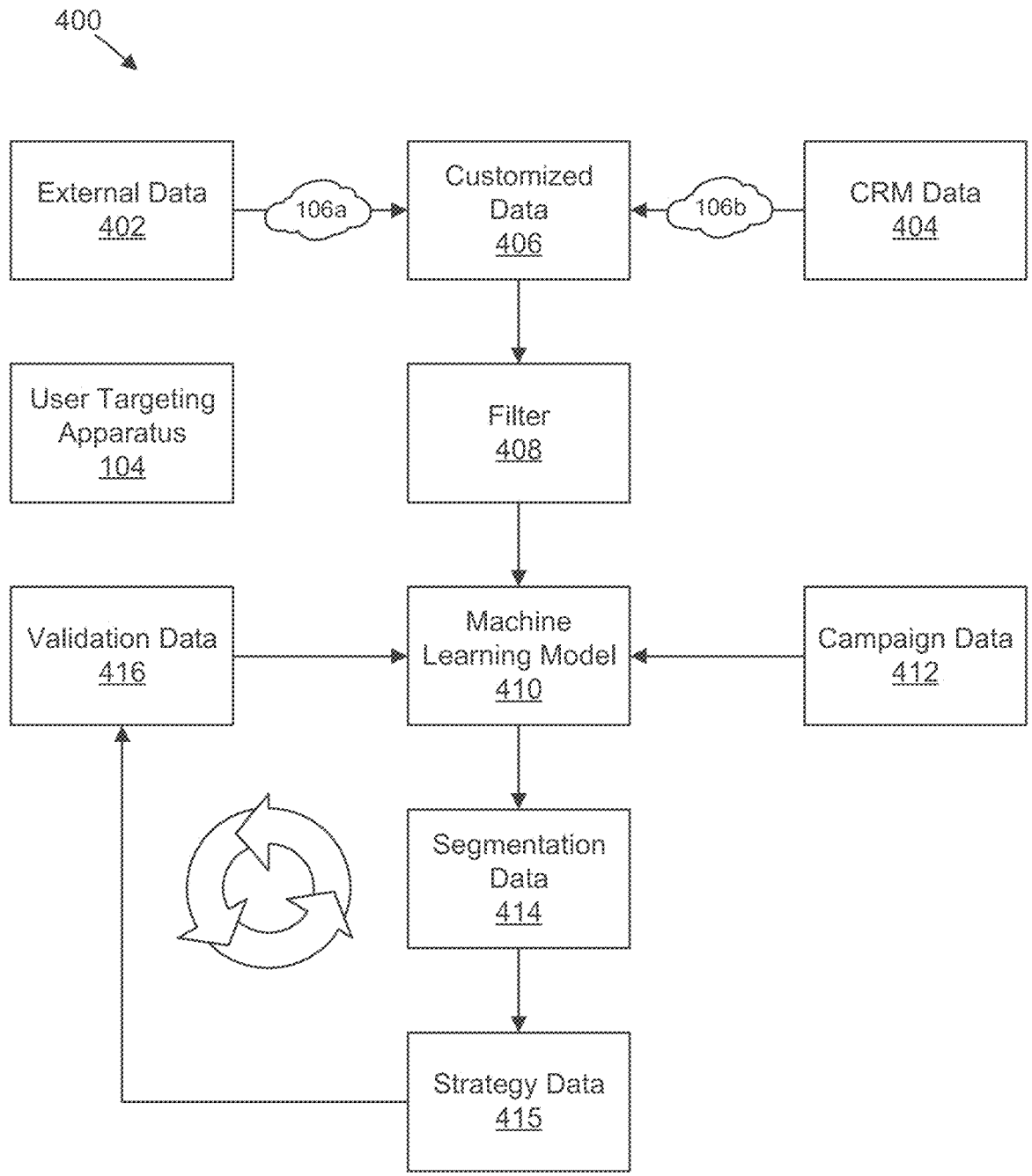
FIG. 4 is a schematic block diagram illustrating an example embodiment of a system for machine learning based user targeting.

FIG. 4 is a schematic block diagram illustrating an example embodiment of a system 400 for machine learning based user targeting. In one embodiment, the entity module 302 receives external data 402 for entities over a network 106a such as the Internet. The external data may be publicly available data from the Internet such as social media data, company profile information, government data, and/or the like. The entity module 302 may further receive internal or domain-specific entity data such as CRM data 404 or other domain-specific data. The entity module 302 may combine the external and internal entity data to create a customized entity data set 406. The combined data may generally have the same contents of the external, publicly available data but in a pretreated data format for use at a later stage, such as for machine learning training.

The filter module 306 may receive one or more filters 408 (e.g., keywords) 408 for filtering the entity data to a subset based on the filters. The filters 408 may be based on data from a CRM system (e.g., filtering the data to entities that are in the CRM data, to entities that have connections to entities in the CRM data, to entities at a certain location or of a certain age, and/or the like). The training module 304, in certain embodiments, trains a machine learning model 410, first, on a corpus of text data, and then on the entity data to generate a machine learning language model. The affinity module 204 provides campaign data 412 to the machine learning model 410, which may include subject data that the subject module 202 receives and/or other campaign-specific data (e.g., a type of the campaign such as a sales campaign or an awareness campaign).

The affinity module 204 receives the output from the machine learning model 410 and determines the affinity levels of the entities for the subject. Based on the affinity levels, the grouping module 308 generates segmentation data 414 that assigns the entities to different segments such as influencers, early adopters, late adopters, laggards, innovators, journalists, bloggers, content creators, or the like. The campaign module 306, in one embodiment, determines strategy data 415 for the campaign such as messaging data indicating the types and content of messaging for particular entities, marketing channel data that specifies effective marketing channels to reach an entity, or the like.

The training module 304, in certain embodiments, generates validation data 416 based on the results of the campaign strategy that is implemented to further refine the machine learning model. The validation data 416 may include false positive data, updated entity data, updated subject data, messaging effectiveness data, marketing channel effectiveness data, and/or the like that can be used to re-train, further train, fine tune, or refine the machine learning model. Since the levels of affinity may be determined just based on the campaign and openly available data, the system 400 has flexibility for applicability to any kinds of promotional activities and could be used as a general-purpose marketing tool.

FIG. 5A depicts one example embodiment of an interface 500 for machine learning based user targeting. The interface 500, which the presentation module 314 may generate, may be an example interface of a visual representation of measures of affinity between the respective entities and the subject, which may be graphically illustrated as the diagonal row of icons 506-510. In this example, each icon 506-510 may represent a prospective customer entity from a data store of prospective customers on a graph that includes a y-axis 502 and an x-axis 504 that, in this example, both represent the entities' affinity with a single selected subject.

The icons 506-510 are positioned in the graph on coordinates proportional to a determined measure of affinity the entities, or prospective customers, have with the subject, in this case, the user's product. In this example, the entities are evaluated for affinity with one subject, so the icons are distributed in one dimension. In other examples, the entities may be evaluated for affinity with more than one subject, which may be represented in graphs in more than one dimension, as described below. In examples with a single variable of subject affinity, the affinity-per-entity may be graphically depicted horizontally or vertically along a single x or y axis, respectively. Thus, the visual representation of the measures of similarity comprises graphical representations of the entities at positions in a graph with a coordinate along a first axis corresponding to the measures of similarity, in this example.

Different classifications of affinity may be labeled appropriately on the graph using the icons 506-510, such as "early adopters" for icons 510 representing entities with high affinity with the product or other category subject, "late adopters" for icons 508 representing entities with low affinity, and "laggards" for icons 506 representing entities that have zero to very little affinity for the subject. This may be shown in the figure with different colors, shapes, sizes, or the like. In certain embodiments, laggards are not shown on the graph because laggards generally may not provide a signal of affinity between a subject and an entity. For instance, icons 510 for prospective contacts classified as having high affinity, or affinity above a selected threshold, with the subject, may be depicted as dark blue or purple icons, whereas icons 508 for prospective contacts classified as having low affinity, or affinity below a selected threshold of semantic similarity in the language model, with the subject, may be depicted as light blue icons. The difference between the dark blue and purple icons 510 are to further distinguish between contacts who may be enthusiasts for the subject but are not industry professionals, depicted in dark blue, and contacts who are industry professionals, depicted in purple. This color scheme is an illustrative example, and such differences between icons representing entities with different characteristics may be illustrated in any other types of colors, shapes, sizes, or other visual indicators.

In certain embodiments, the presentation module 314 receives user input in the form of a hover action, a tap action, a click or selection action, or the like on an icon 512 and presents additional metadata or a summary of descriptive data for the entity that the icon 512 represents such that affinity segment the entity belongs to, the entity name, age, job, and/or other demographic information about the entity in a pop-up window, for example.

FIG. 5B depicts an example embodiment of another interface 520 for machine learning based user targeting. In one embodiment, the interface 520 is substantially similar to the interface 500 described in FIG. 5A. Furthermore, in certain embodiments, a system of this disclosure may evaluate affinities between entities and more than one subject, which the presentation module 314 may depict in a graph in which entity icons 506-510 may be distributed in more than one dimension with coordinates proportional to their respective affinity with more than one subject. For example, a subject module 202 of the system may receive second subject data associated with a second subject, where the second subject data may include data that describes the second subject. The system may also provide the second subject data as input to the machine learning model 410. An affinity module 204 of the system may determine, using the machine learning model 410, an affinity level of each of one or more entities in relation to the second subject as well as in relation to the first subject. A presentation module 314 of the system may output, for display, a dashboard graph or other visual representation of the affinity levels of each of the one or more entities in relation to each of the two or more subjects.

For example, a presentation module 314 may display each of the entities across a two-dimensional graph at a position along an x-axis 504 proportional to the entities' affinity level for a first subject, and along a y-axis 502 proportional to the entities' affinity level for a second subject. A campaign module 206 of the system may also generate one or more promotional campaign strategies for the first subject based in part on the affinity level of each of the one or more entities in relation to the first subject and based in part on the affinity level of each of the one or more entities in relation to the second subject. For example, some companies and other users may want to offer a product or service aimed at a crossover between a certain product category and a certain industry, which makes useful the determination of entities' affinities for both of two subjects, such as the product category and the certain industry. Marketing professionals may implement a marketing campaign to contact only a certain number of contacts with highest affinity for a subject or combination of subjects, such as the top 1,000 contacts in terms of their affinities for certain product category and a certain industry, for example.

In some examples, the presentation module 314 may graph entities along different axes to represent a first affinity level for a product and a second affinity level representing an influence in the corresponding product space. In some examples, the system may make a more fine-grained division of entities on the graph to optimize for a variety of more fine-grained iterative campaigns, addressing small, experimental and/or influence-building campaigns before rolling out larger campaigns to larger market segments or a full campaign to a general market. As one example, fine-grained campaigns may include isolating a certain percentage of entities that are among the highest affinity and lowest influence, that might be selected for experimental campaign messages, to gauge which outreach messages are successful without having a significant effect on the larger market. In another example, the system can isolate a selected percentage of late adopters or low affinity entities that may represent an ideal group to refine a complex message. In another example, once a product and its marketing messaging have been refined and deemed ready to advance to a market at large, the system may isolate members of the press and celebrity influencers with messaging tuned to seek endorsements and favorable press and social media coverage, prior to launching a full campaign to the market at large. The different icons 506-510 may be displayed in different colors that may represent different classifications of affinity of the entities with the subjects, and whether the entities are industry professionals.

In certain embodiments, the presentation module 314 presents a menu 524, 526 that includes the additional subjects for each axis 502, 504, e.g., a drop-down menu. A user may select inputs indicating a first selected subject and a second selected subject from among the first subject or the plurality of additional subjects. The presentation module 314 outputs, for display, graphical representations of the entities at positions in the graph with a first coordinate along a first axis 504 corresponding to the measures of similarity between the first selected subject and the entities, and with a second coordinate along a second axis 502 corresponding to the measures of similarity between the second selected subject and the entities.

FIG. 5C depicts an example embodiment of another interface 540 for machine learning based user targeting that may be generated by a campaign module 206 or a presentation module 314 of a system of this disclosure. The interface 540 of FIG. 5C depicts an example graph or chart that presents a ranking of channels depicted with horizontal bars proportional in length to predicted effectiveness for a selected entity for targeting an entity selected from the interface illustrated in FIGS. 5A and 5B. The channels may include phone, email, web chat, social media, and SMS/text messages. In the depicted embodiment, a campaign module 206 of the current disclosure has determined, based at least in part on data such as, e.g., data about a selected entity, that the phone channel 542 is determined to be the most effective manner in which to reach the selected entity based on the machine learning model's results.

FIG. 5D depicts an example embodiment of another interface 560 for machine learning based user targeting that may be generated by a campaign module 206 or a presentation module 314 of a system of this disclosure. In FIG. 5D, a campaign module 206 or a presentation module 314 may output a graph or chart of the messaging strategy 560 or type of messaging, in order of predicted effectiveness, represented by extent along an x-axis or in a horizontal direction, for the selected entity. For instance, in the depicted example, a campaign module 206 of the current disclosure has determined, based at least in part on data such as, e.g., data about a selected entity, a personalized message strategy 562 to be the most effective manner in which to develop content for the messaging that is targeted to the selected entity. Other messaging strategies may include simulation, self-monitoring, and comparison messaging, as further non-limiting examples.

FIG. 5E depicts an example embodiment of another interface 580 for machine learning based user targeting that may be generated by a campaign module 206 or a presentation module 314 of a system of this disclosure. FIG. 5E depicts an embodiment of a graph or chart of influencers that the machine learning model identifies in the entity data. The influencers may include journalists, celebrities, bloggers, content creators, product reviewers, social media influencers, and/or the like. The influencers may be depicted on the graph based on the level of affinity of the influencers with the subject that is being offered, similar to the affinity graphs described above with reference to FIGS. 5A and 5B.

Other interfaces that the presentation module 314 may provide include a word processing interface for creating or modifying, within the user's dashboard, a messaging template that the machine learning model generates for targeting a specific entity; a personality chart that provides personality insights for a selected entity; previous communications with an entity; new contacts/entities entered into the CRM; a link to or an interface for browsing CRM data; and/or the like.

Figure 6:
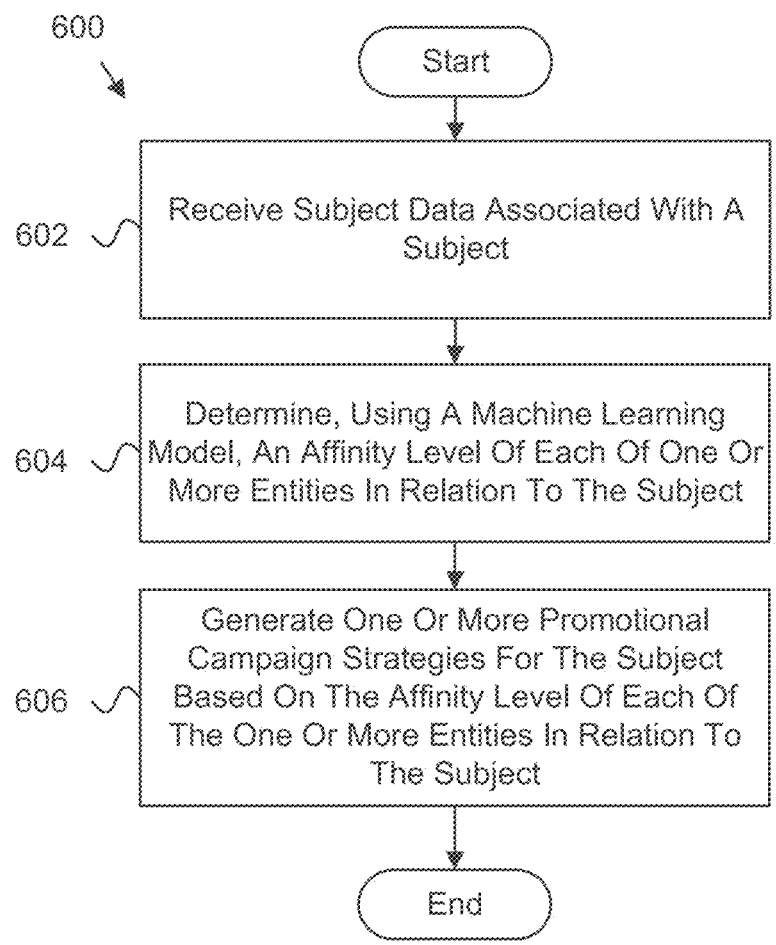
FIG. 6 is a schematic flow-chart diagram illustrating one embodiment of a method for machine learning based user targeting.

FIG. 6 is a schematic flow-chart diagram illustrating one embodiment of a method 600 for machine learning based user targeting. In one embodiment, the method 600 begins and the subject module 202 receives 602 subject data associated with a subject. The subject data may include data that describes the subject.

In further embodiments, the affinity module 204 determines 604, using a machine learning model, an affinity level of each of one or more entities in relation to the subject. The subject data may be provided as input to the machine learning model. In certain embodiments, the campaign module 206 generates 606 one or more promotional campaign strategies for the subject based on the affinity level of each of the one or more entities in relation to the subject. The one or more promotional campaign strategies may be intended to target the subject to the one or more entities, and the method 600 ends.

Figure 7:
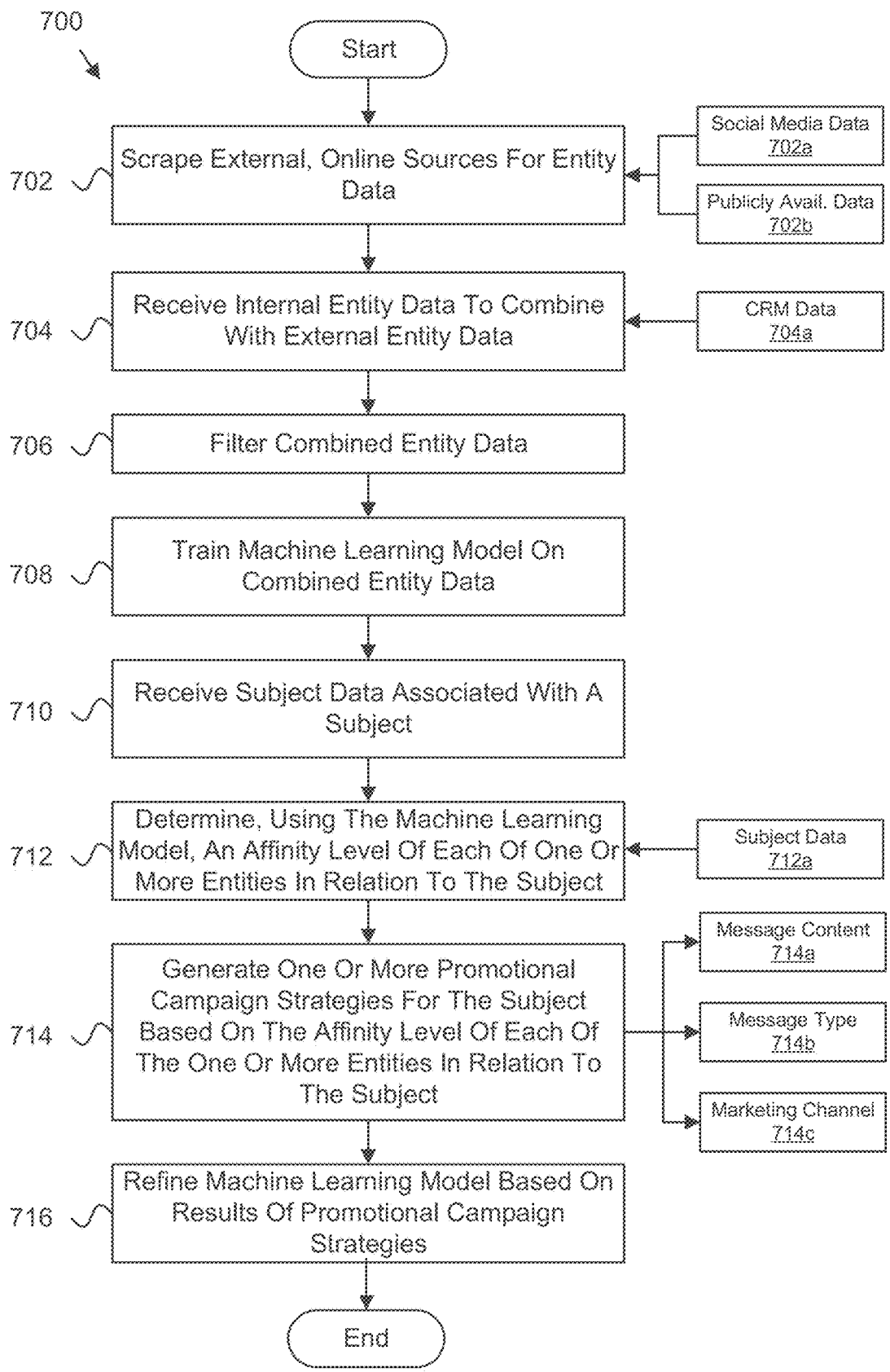
FIG. 7 is a schematic flow-chart diagram illustrating one embodiment of another method for machine learning based user targeting.

FIG. 7 is a schematic flow-chart diagram illustrating one embodiment of another method 700 for machine learning based user targeting. In one embodiment, the method 700 begins and the entity module 302 scrapes 702 external, online sources (e.g., websites) for entity data associated with the one or more entities. The external data may include social media data 702*a* and/or other publicly available data 702*b*.

In further embodiments, the entity module 302 receives 704 internal, domain-specific entity data to combine with the external entity data. The internal data may include CRM data 704*a*. The filter module 306 filters 706 the combined entity data based on filter criteria for the entity data (e.g., filter criteria that filters the entity data by age, job, industry, or the like).

In one embodiment, the training module 304 trains 708 the machine learning model on the combined entity data. In various embodiments, the subject module 202 receives 710 subject data associated with a subject. The subject module 202 may provide the subject data 714*a* to the machine learning model, which the affinity module 204 uses to determine 712, using the machine learning model, an affinity level of each of the entities in relation to the subject.

In one embodiment, the campaign module 206 generates 714 one or more promotional campaign strategies for the subject based on the affinity level of each of the one or more entities in relation to the subject such as message content strategies 714*a*, message type strategies 714*b*, marketing channel strategies 714*c*, or the like. Based on feedback from the campaign strategy (e.g., conversion rate, response rate, call-backs, sales, false positives, or the like), the training module 304 refines 716 the machine learning model, and the method 700 ends.

Means for receiving subject data associated with a subject include, in various embodiments, one or more of an user targeting apparatus 104, a subject module 202, an information handling device 102, a device driver, a controller (e.g., a device driver, or the like) executing on an information handling device 102, a processor, an FPGA, an ASIC, other logic hardware, and/or other executable code stored on a computer-readable storage medium. Other embodiments may include similar or equivalent means for receiving subject data associated with a subject.

Means for determining, using a machine learning model, an affinity level of each of one or more entities in relation to the subject include, in various embodiments, one or more of an user targeting apparatus 104, an affinity module 202, an information handling device 102, a device driver, a controller (e.g., a device driver, or the like) executing on an information handling device 102, a processor, an FPGA, an ASIC, other logic hardware, and/or other executable code stored on a computer-readable storage medium. Other embodiments may include similar or equivalent means for determining, using a machine learning model, an affinity level of each of one or more entities in relation to the subject.

Means for generating one or more promotional campaign strategies for the subject based on the affinity level of each of the one or more entities in relation to the subject include, in various embodiments, one or more of an user targeting apparatus 104, a campaign module 202, an information handling device 102, a device driver, a controller (e.g., a device driver, or the like) executing on an information handling device 102, a processor, an FPGA, an ASIC, other logic hardware, and/or other executable code stored on a computer-readable storage medium. Other embodiments may include similar or equivalent means for generating one or more promotional campaign strategies for the subject based on the affinity level of each of the one or more entities in relation to the subject.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
one or more memory devices; and
one or more processing devices, in communication with the one or more memory devices, and configured to implement:
a subject module that receives subject data associated with a subject, the subject data comprising data that describes the subject;
an entity module that obtains external third party entity data from at least one online source and supplements the external third party entity data with domain-specific entity data comprising internal entity data to create a customized entity data set;
a training module that trains a machine learning model using the customized entity data set;
an affinity module that determines, using the machine learning model, an affinity level of each of one or more entities in relation to the subject, the subject data provided as input to the machine learning model, the machine learning model providing output for determining the affinity level based at least in part on a digital encoding of semantic similarity between an entity and the subject using text descriptions of the entity and the subject, the affinity level indicating the entity's likelihood of providing a response related to the subject;
a presentation module that:
generates an interactive graphical interface comprising graphical representations of one or more entities, the one or more entities divided into segmented groups within the graphical interface according to their affinity levels with the subject such that each entity within a segmentation group is indicated with a same graphical representation that is different from a graphical representation of a different segmentation group;
presents the interactive graphical interface on a display;
receives an input on one of the graphical representations of an entity within the graphical interface in response to detecting a user's interaction with the one of the graphical representations; and
dynamically presents metadata for an entity in response to receiving input on the graphical representation of the entity; and
a campaign module that generates one or more promotional campaign strategies for the subject based at least in part on the affinity level of each of the one or more entities in relation to the subject, the one or more promotional campaign strategies targeting the subject to the one or more entities,
wherein the entity module monitors for new entity data from the at least one online source and supplements the customized entity data set with new entity data that is available from the at least one online source, and
wherein the training module receives feedback associated with the one or more promotional campaign strategies and iteratively retrains the machine learning model using the received feedback and the supplemented customized entity data to refine the one or more promotional campaign strategies for the subject.

2. The apparatus of claim 1, wherein obtaining the external third party entity data comprises scraping one or more online sources for entity data associated with the one or more entities, the entity data comprising text data that describes the one or more entities.

3. The apparatus of claim 2, wherein the machine learning model comprises a multi-dimensional tensor model that generates measures of mathematical similarity between a mathematical representation of the subject data and a mathematical representation of entity data by:
generating a tensor representation of the subject data in the machine learning model; and
determining the measures of mathematical similarity, in the machine learning model, between the tensor representation of the subject data and tensor representations of the entity data.

4. The apparatus of claim 2, further comprising a filter module that filters the entity data based on one or more provided filter criteria prior to training the machine learning model, the machine learning model trained using the filtered entity data.

5. The apparatus of claim 1, wherein the training module further trains the machine learning model using a generative adversarial network.

6. The apparatus of claim 1, wherein the training module periodically trains the machine learning model with one or more of new entity data from the one or more online sources and new domain-specific entity data.

7. The apparatus of claim 1, wherein the feedback comprises information provided by one or more entities with respect to the subject.

8. The apparatus of claim 1, wherein the subject data comprises text data describing the subject.

9. The apparatus of claim 1, further comprising a grouping module that assigns each of the one or more entities to one or more groups based on the affinity level for each of the one or more entities.

10. The apparatus of claim 9, wherein the one or more groups comprises one or more of influencers, early adopters, late adopters, and innovators.

11. The apparatus of claim 1, further comprising a channel module that determines, as part of the one or more promotional campaign strategies, one or more marketing channels for targeting the subject to the one or more entities based on the affinity levels of the one or more entities.

12. The apparatus of claim 1, further comprising a messaging module that determines, as part of the one or more promotional campaign strategies, a messaging strategy for contacting the one or more entities to promote the subject to the one or more entities based on the affinity levels of the one or more entities and one or more measures of effectiveness of different types of messages and messaging channels that the machine learning model generates for the one or more entities.

13. The apparatus of claim 12, wherein the messaging strategy is selected from the group consisting of a comparison strategy, a self-monitoring strategy, a cooperation strategy, a personalization strategy, a simulation strategy, and a praise strategy.

14. The apparatus of claim 13, wherein the messaging module generates a message template for an entity of the one or more entities based on a selected messaging strategy.

15. The apparatus of claim 1, further comprising a presentation module that generates interactive graphical representations of the affinity level for each of the one or more entities in relation to the subject.

16. The apparatus of claim 1, wherein:
the subject is a first subject and the subject data are first subject data;
the subject module receives second subject data associated with a second subject, the second subject data comprising data that describes the second subject;
the affinity module determines, using the machine learning model, an affinity level of each of one or more entities in relation to the second subject as well as in relation to the first subject, the second subject data provided as input to the machine learning model; and
the campaign module generates the one or more promotional campaign strategies for the first subject based in part on the affinity level of each of the one or more entities in relation to the first subject and based in part on the affinity level of each of the one or more entities in relation to the second subject.

17. A method, comprising:
receiving, by one or more processing devices, subject data associated with a subject, the subject data comprising data that describes the subject;
obtaining, by the one or more processing devices, external third party entity data from at least one online source and supplementing the external third party entity data with domain-specific entity data comprising internal entity data to create a customized entity data set;
training, by the one or more processing devices, a machine learning model using the customized entity data set;
determining, by the one or more processing devices, using the machine learning model, an affinity level of each of one or more entities in relation to the subject, the subject data provided as input to the machine learning model, the machine learning model providing output for determining the affinity level based at least in part on a digital encoding of semantic similarity between an entity and the subject using text descriptions of the entity and the subject, the affinity level indicating the entity's likelihood of providing a response related to the subject;
generating an interactive graphical interface comprising graphical representations of one or more entities, the one or more entities divided into segmented groups within the graphical interface according to their affinity levels with the subject such that each entity within a segmentation group is indicated with a same graphical representation that is different from a graphical representation of a different segmentation group;
presenting the interactive graphical interface on a display;
receiving an input on one of the graphical representations of an entity within the graphical interface in response to detecting a user's interaction with the one of the graphical representations;
dynamically presenting metadata for an entity in response to receiving input on the graphical representation of the entity;
generating, by the one or more processing devices, one or more promotional campaign strategies for the subject based at least in part on the affinity level of each of the one or more entities in relation to the subject, the one or more promotional campaign strategies targeting the subject to the one or more entities;
monitoring for new entity data from the at least one online source and supplements the customized entity data set with new entity data that is available from the at least one online source;
receiving, by the one or more processing devices, feedback associated with the one or more promotional campaign strategies; and
iteratively retraining, by the one or more processing devices, the machine learning model using the received feedback and the supplemented customized entity data to refine the one or more promotional campaign strategies for the subject.

18. The method of claim 17, wherein obtaining the external third party entity data comprises scraping one or more online sources for entity data associated with the one or more entities, the entity data comprising text data that describes the one or more entities.

19. The method of claim 18, further comprising training, by the one or more processing devices, the machine learning model using a generative adversarial network.

20. A computer program product, comprising a computer-readable storage medium having program code embodied therein, the program code executable by one or more processing devices for:
receiving subject data associated with a subject, the subject data comprising data that describes the subject;
obtaining external third party entity data from at least one online source and supplementing the external third party entity data with domain-specific entity data comprising internal entity data to create a customized entity data set;
training a machine learning model using the customized entity data set;
determining, using the machine learning model, an affinity level of each of one or more entities in relation to the subject, the subject data provided as input to the machine learning model, the machine learning model providing output for determining the affinity level based at least in part on a digital encoding of semantic similarity between an entity and the subject using text descriptions of the entity and the subject, the affinity level indicating the entity's likelihood of providing a response related to the subject;
generating an interactive graphical interface comprising graphical representations of one or more entities, the one or more entities divided into segmented groups within the graphical interface according to their affinity levels with the subject such that each entity within a segmentation group is indicated with a same graphical representation that is different from a graphical representation of a different segmentation group;
presenting the interactive graphical interface on a display;
receiving an input on one of the graphical representations of an entity within the graphical interface in response to detecting a user's interaction with the one of the graphical representations;
dynamically presenting metadata for an entity in response to receiving input on the graphical representation of the entity;
generating one or more promotional campaign strategies for the subject based at least in part on the affinity level of each of the one or more entities in relation to the subject, the one or more promotional campaign strategies targeting the subject to the one or more entities;

monitoring for new entity data from the at least one online source and supplements the customized entity data set with new entity data that is available from the at least one online source;
receiving feedback associated with the one or more promotional campaign strategies;
iteratively retraining the machine learning model using the received feedback and the supplemented customized entity data to refine the one or more promotional campaign strategies for the subject; and
outputting, for display, a visual representation of the affinity level of each of the one or more entities in relation to the subject.

21. A method, comprising:
receiving, by one or more processing devices, subject data associated with a subject, the subject data comprising data that describes the subject;
obtaining, by the one or more processing devices, external third party entity data from at least one online source and supplementing the external third party entity data with domain-specific entity data comprising internal entity data to create a customized entity data set;
training, by the one or more processing devices, a machine learning model using the customized entity data set;
determining, by the one or more processing devices, using the machine learning model, an affinity level of each of one or more entities in relation to the subject, the subject data provided as input to the machine learning model, the machine learning model providing output for determining the affinity level based at least in part on a digital encoding of semantic similarity between an entity and the subject using text descriptions of the entity and the subject, the affinity level indicating the entity's likelihood of providing a response related to the subject;
generating an interactive graphical interface comprising graphical representations of one or more entities, the one or more entities divided into segmented groups within the graphical interface according to their affinity levels with the subject such that each entity within a segmentation group is indicated with a same graphical representation that is different from a graphical representation of a different segmentation group;
presenting the interactive graphical interface on a display;
receiving an input on one of the graphical representations of an entity within the graphical interface in response to detecting a user's interaction with the one of the graphical representations;
dynamically presenting metadata for an entity in response to receiving input on the graphical representation of the entity;
determining one or more messaging strategies for each of the one or more entities based on the affinity levels of each of the one or more entities;
presenting a list of messaging strategies for each of the one or more entities in an order ranked by a determined messaging effectiveness; and
dynamically generating a modifiable messaging template based on a selected one of the list of messaging strategies for a selected entity;
generating, by the one or more processing devices, one or more promotional campaign strategies for the subject based at least in part on the affinity level of each of the one or more entities in relation to the subject, the one or more promotional campaign strategies targeting the subject to the one or more entities;
monitoring for new entity data from the at least one online source and supplements the customized entity data set with new entity data that is available from the at least one online source;
receiving, by the one or more processing devices, feedback associated with the one or more promotional campaign strategies;
iteratively retraining, by the one or more processing devices, the machine learning model using the received feedback and the supplemented customized entity data to refine the one or more promotional campaign strategies for the subject; and
outputting, for display, by the one or more processing devices, a visual representation of the affinity level of each of the one or more entities in relation to the subject.

* * * * *